March 6, 1934. N. SCANDORE 1,950,195
BOX
Filed April 15, 1932
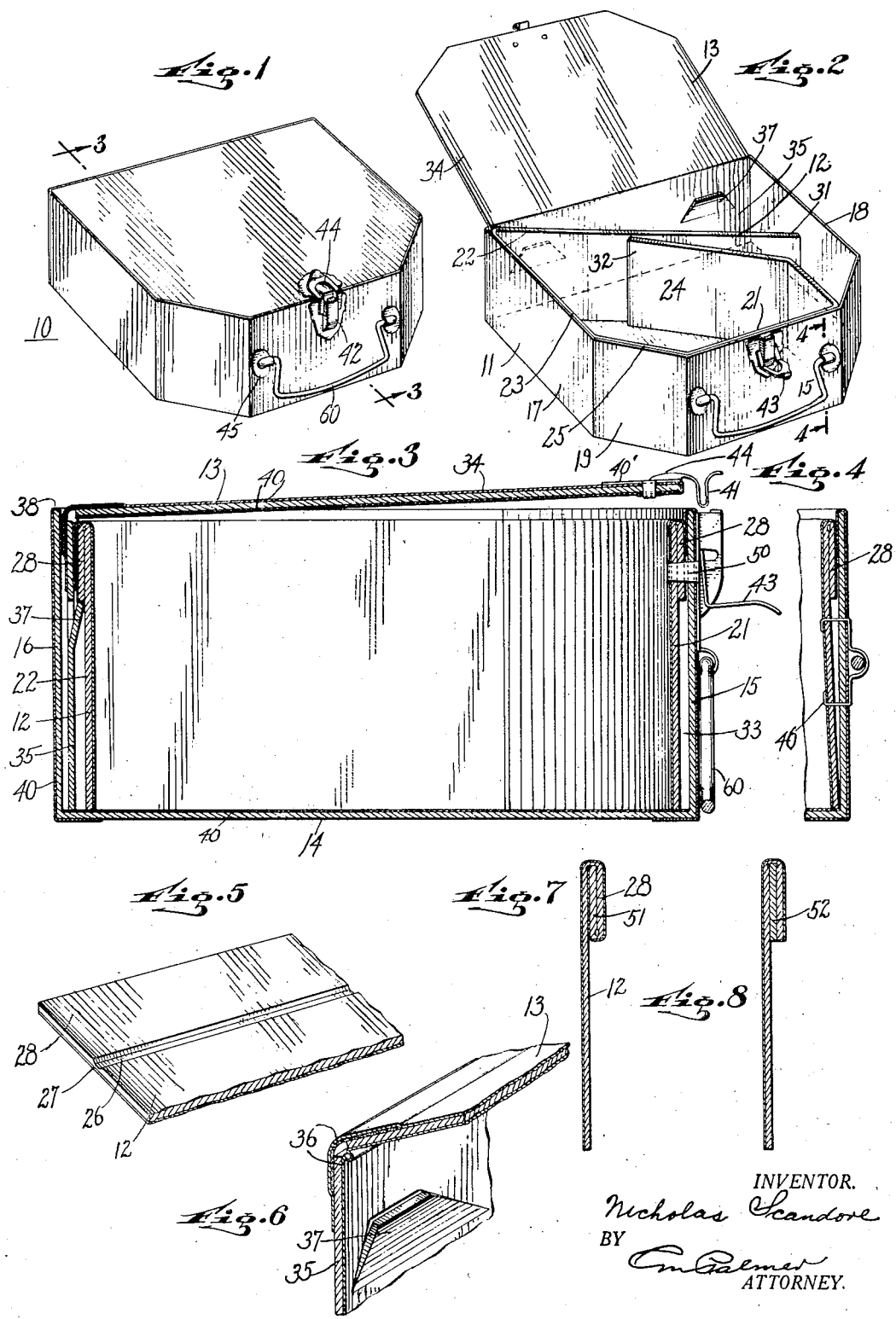
INVENTOR.
Nicholas Scandore
BY
ATTORNEY.

Patented Mar. 6, 1934

1,950,195

UNITED STATES PATENT OFFICE 1,950,195

BOX

Nicholas Scandore, New York, N. Y.

Application April 15, 1932, Serial No. 605,381

1 Claim. (Cl. 229—23)

The invention relates to article carrying structures which are adapted to have a wide variety of uses and which are particularly adapted to be conveniently carried about by a person, the structures being constituted in the form of a receptacle customarily utilized with frequency during the course of a normal day and being particularly applicable for carrying children's school supplies, luncheons, miscellaneous small articles or combinations thereof although not limited thereto. More particularly the present invention relates to improvements in a structure of the type usually designated a box to contain in compact fashion various articles which are readily accessible for frequent usage.

In one embodiment, the article carrying structure or box of the present invention includes a casing in which an inner rim is disposed to secure one complement of the cover for the casing in place, there being suitable clearance between the walls of the casing and portions of the rim to provide an air cushion to take up or absorb any jar to which the rim may be subject, the walls of the rim preferably being of relatively heavy cardboard or the like and the walls of the casing being preferably of cardboard stock slightly of a less thickness.

The rim of the character referred to is of relatively heavy stock to reinforce the walls of the casing and comprises a unitary member having its free ends secured together by friction. In accordance with one form of the invention, a portion of the rim is also made substantially twice the thickness of the relatively heavy cardboard stock utilized to construct the rim. In this connection an upper portion of the rim is folded over and secured against the rear face thereof to form a ledge. However, due to the stock of the rim being relatively thick and heavy, it has been found that it is first necessary to weaken the same preparatory to folding. If the body of the rim be scored or creased in the usual manner and the portion forming the ledge be folded over and against the back thereof a ragged and broken surface is formed which detracts from the appearance of the rim concomitantly decreasing the life and durability thereof. It is therefore a particular object of the invention to provide a reinforced rim for the casing having a turned over ledge which is secured to the back face of the rim and to provide a smooth upper edge without detracting from the appearance of the rim or otherwise lessening its durability.

According to another form of the invention, the rim is reinforced by interposing between its overhanging portion or ledge and body of the rim an independent member for increasing the thickness of the upper portion of the rim substantially to three times the thickness of the stock. In another form of the invention, the rim may be reinforced by first folding to provide an overhanging ledge without cracking or otherwise weakening upper edge surface of the rim and subsequently folding the lower portion of the ledge inwardly and upwardly to provide an intermediate depending member which is secured to the rear face of the rim.

It is another object of the invention to provide a casing in which a reinforced rim is provided with a ledge adapted to interlock with struck out portions of a component or a cover to prevent the latter from being disengaged from the interior of the casing. It is a further object to provide a cover having components interconnected by muslin or the like to permit the components to be easily adjusted, one of the components being interposed between the casing and the rim, the other component being swingable towards and away from the rim of the casing, the rim being detachably connected to the one of the components.

A further object of the invention comprehends the utilization of the upper edge of the rim for seating the swingable portion of the cover which forms a closure for the casing and has its upper surface preferably flush with the upper edges of the walls of the casing.

And still other objects, features, and advantages of my invention are to improve generally the method of assembling the container or box of the character alluded to and to provide an economical method for the purposes set forth which comprises relatively few steps and which is easy to carry into effect in relatively small time interval.

Other objects are in part obvious and in part pointed out hereinafter.

The invention is exemplified in the combination and arrangement of parts shown in the accompanying drawing and described in the following specification and it is more particularly pointed out in the appended claim.

Referring to the drawing:

Fig. 1 is a view of the box, according to the invention, shown in perspective and closed.

Fig. 2 is a view of the box illustrated in perspective and in open position to show the interior construction of the casing before the rim is arranged against all the inside faces thereof.

Fig. 3 is a section taken approximately along the line 3—3 of Fig. 1.

Fig. 4 is a section along the line 4—4 of Fig. 2.

Fig. 5 is a fragmentary view of a piece of the rim before folding thereof.

Fig. 6 is a fragmentary view of the cover showing the manner in which the complements thereof are swingably connected.

Fig. 7 is a sectional view of a modified rim for the casing and

Fig. 8 is still another modification of a rim.

As will be readily understood from a consideration of the underlying features of the box construction in accordance with the invention, various changes and modifications may be effected thereto without departing from the underlying principles for improving generally the efficiency and simplicity of the container of the character hereindescribed and for providing a storing and carrying structure, which is durable as to construction, which is reliable in operation and which comprises few parts to permit of economy in manufacture.

In the form illustrated, the box construction is broadly designated 10 and comprises essentially three parts, to wit, a casing 11, an inner reinforcing rim 12 and a cover 13.

The casing includes a bottom wall 14, front wall 15, back wall 16, side walls 17 and 18, the latter and the front wall being interconnected by a beveled wall as 19. The front, back, side and beveled walls constitute an enclosure surrounding the bottom wall 14 and these may be suitably connected in any well known fashion. The enclosure is preferably of several ply cardboard stock although of course the invention is not limited to cardboard or the like.

Associated with the enclosure above alluded to and preferably arranged in juxtaposition with respect to the upstanding walls thereof is the inner rim generally denoted 12. The rim is utilized to reinforce the walls of the enclosure of the casing and preferably is a unitary elongated member which has been suitably bent to conform substantially to a corresponding contour of the enclosure that is provided with a front wall 21, rear wall 22, side walls 23 and 24, the latter being interconnected with the front wall 21 of the rim by beveled sides as 25. The rim is preferably of a relatively heavy cardboard and of a thickness slightly greater than the thickness of the walls of the enclosure of the casing.

In folding cardboard of relatively heavy stock it has been customary to either crease or score before folding. With either method, the cardboard generally cracked and left a ragged edge or surface. According to the present invention, a single sheet of cardboard is utilized to provide a reinforced rim of substantially twice the normal strength of the board although without employing a corresponding amount of cardboard and without in any way detracting from the appearance of the rim.

For this purpose, the upper portion of the rim is slightly weakened by providing therein a groove as 26 which has a reduced wall 27 interconnecting the ledge forming part 28 and body of the rim 12 that is to say, part 28 is folded or swung towards the body of the rim about the reduced wall portion of the groove 26 and is subsequently secured to the body of the rim.

The ledge 28 may be secured to the rim by cement or glue or in any suitable fashion, the upper surface of the interconnecting wall 27 being thus left smooth and unbroken and forms a seat for the closure complement of the cover 13.

The sides of the reinforced rim are placed in juxtaposition with respect to corresponding sides of the enclosure and the free terminals of this rim, namely 31 and 32 when disposed against like walls of the casing frictionally engage and by reason of this connection the rim is maintained in proper location against the walls of the enclosure. Owing to the ease with which the rim may be properly arranged and secured within the casing to reinforce the same, a needless step such as securing the ends of the rim by glue or the like is done away with and hence considerable time is saved in assembling.

According to the invention the rim is reinforced and the rim reinforces the enclosure of the casing and although the rim is reinforced to substantially twice its strength, no additional stock for the rim is utilized apart from the original stock employed. In addition, provision has been made to absorb appreciable shock imparted to the rim, which shock is substantially prevented from reaching the enclosure of the casing. In other words, the ledge 28 reinforces the upper part of the rim, and the air gap 33 takes up jars or the like transmitted to the other interior portions of the rim. In this way, substantially the entire height of the enclosure is reinforced.

The cover 13 comprises two components, one a swingable closure 34, and the other an anchoring member 35 and these are swingably interconnected by pieces of muslin, cloth or the like as 36.

The anchoring member 35 is provided with a pair of spaced struck out lugs or tabs 37 and these cooperate to interlock with the bottom face of ledge 28 forming a connection between the anchoring component and the reinforcing rim to prevent the cover from being accidentally or needlessly detached from the casing, the outer muslin between the components being adapted to be positioned on the top face 38 of the rear wall 16 to prevent undue wear of and preserve edge 38 and also permit the swingable closure sufficient freedom to overhang this edge.

In the assembling of the container, the rim may be first positioned within the casing and subsequently arranged adjacent to the walls thereof. Following this operation the anchoring complement is located between the rear walls of the rim and casing and is then forced downwardly until its bottom face rests on the bottom of the casing and in this position the struck out tabs abut or interlock with the bottom face of the ledge of the rim. Or alternatively, the anchoring complement may be first positioned within the casing and subsequently the free ends of the rim be frictionally secured as hereinbefore set forth. Arranged in this fashion, the struck out tabs also cooperate with the lower face of the adjacent ledge to prevent outward displacement of the anchoring complement.

As illustrated, the height of the reinforcing rim is slightly less than the height of the walls of the casing and as previously pointed out the top face of the rim forms a seat for the swingable complement of the cover, which by reason of the enclosure extending above the rim, the cover is so positioned as to be flush with the top edges of the enclosure.

Provision has been made for disconnectibly locking the swingable complement of the cover to the casing. To this end, the top face of the cover has secured thereto a suitable plate 40' which carries a reflexed member 41 adapted to be received in a housing 42 to which the swingable buckle 43 is hinged, the body of the buckle being bent substantially at right angles whereby its upper portion when the buckle is swung upwardly may cooperate with a raised portion 44 carried by plate 40' and hold the lip 41 within its housing and the swingable complement of the cover against its seat, the housing being secured by straps as 50 passing through the front wall of the housing and the reinforced part of the rim.

Easy access may be had to the inner compartment of the container by simply lifting the buckle away from the raised portion 44 and swinging same towards its housing. The cover may then be quickly raised by grasping the free portion of the reflexed member 41 and lifting upwardly.

To enhance the appearance of the inside surfaces of the compartment and the outside walls of the casing and cover therefor a suitable finishing lining as 40 in appropriate colors may be applied where desirable.

In order that the container may be conveniently carried about by a person, a handle 60 in the form of a bail may be attached to the front wall of the casing in any suitable manner. As shown clips 45 forming sockets for loosely and rotatably receiving the terminals of the bail are secured to the front wall of the casing by the aid of prongs 46 or the like passing through the walls of the casing and the associated rim, which prongs are suitably bent for fastening as is well understood.

In the form according to Fig. 7, the ledge 28 is provided with an upwardly bent portion 51 which is disposed in juxtaposition with respect to the ledge 28 and secured against the body of the rim. In this way the upper part of the body is reinforced substantially to three times its original strength, the intermediate portion 51 being an integral part of ledge 28 being folded in such manner as to provide a smooth lower face.

According to the showing of Fig. 8, the rim is reinforced to increase its strength by an independent member 52 interposed between and secured to the adjacent faces of the overhanging ledge and the body of the rim.

While the invention has been described as being particularly useful to carry school supplies for children, luncheons or the like, it is to be understood that the invention is not limited to these articles and of course is capable of embodiment in whole or in part to carry other articles than those herein specifically referred to.

In the broader aspects of the invention, I do not desire to be understood as limiting its embodiments to details herein shown illustratively as a wide variety of modifications may be made within the scope of the appended claim without departing from the spirit of the invention.

I claim:

In a device of the character described, a casing having a wall, an enclosure surrounding said wall, means for reinforcing said enclosure comprising a rim, the latter having a turned over portion provided with a smooth upper face disposed below the upper edge of the enclosure, the turned over portion overlapping an outside face of the rim and secured thereto to provide a ledge, the rim being provided with free terminals removably and frictionally secured, a cover comprising an anchoring member and a closure, the anchoring member having struck out means adapted to abut said ledge for removably holding the cover to the casing, the closure being adapted to seat on said smooth face so as to be flush with the upper edge of the enclosure, flexible means connecting the closure and the anchoring member and means for detachably locking the closure to the casing.

NICHOLAS SCANDORE.